July 25, 1967
M. A. STICKELBER
3,332,368
CONTINUOUS DOUGH MIXER
Filed Dec. 21, 1965
4 Sheets-Sheet 1
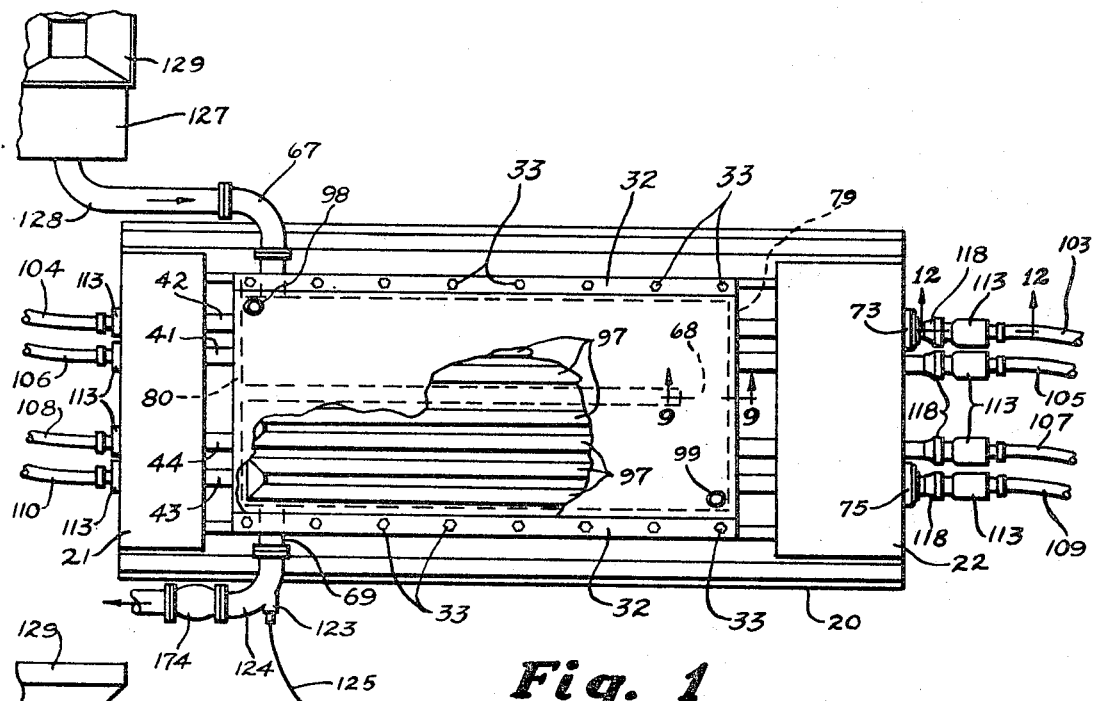
Fig. 1
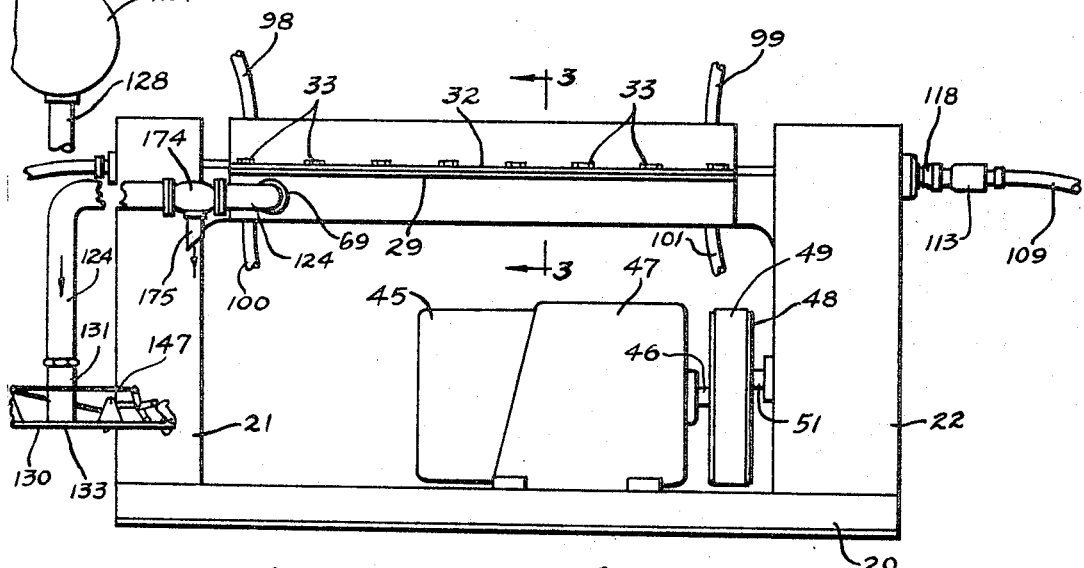
Fig. 2
Fig. 9
INVENTOR.
MERLIN A. STICKELBER
BY
Alfred R. Fuchs
ATTORNEY

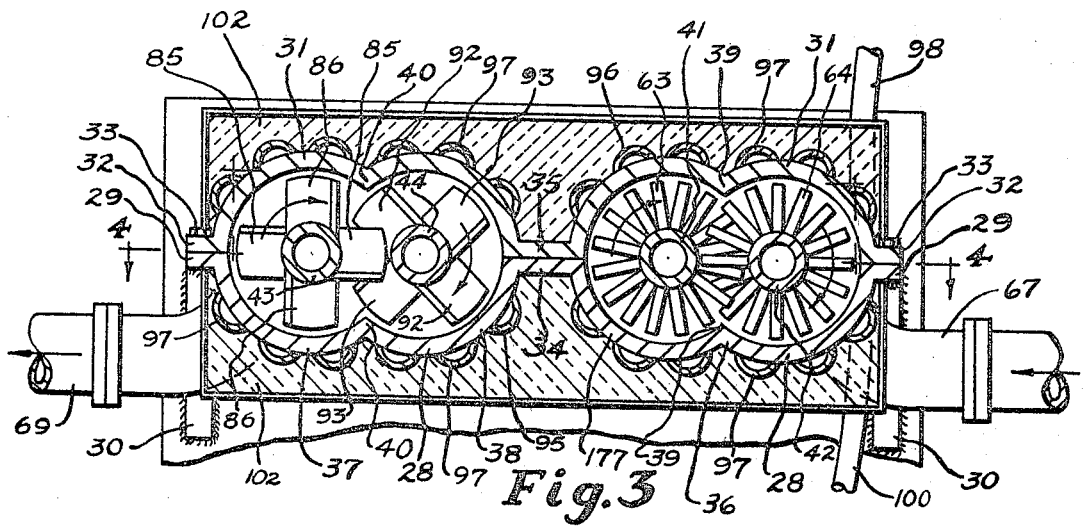
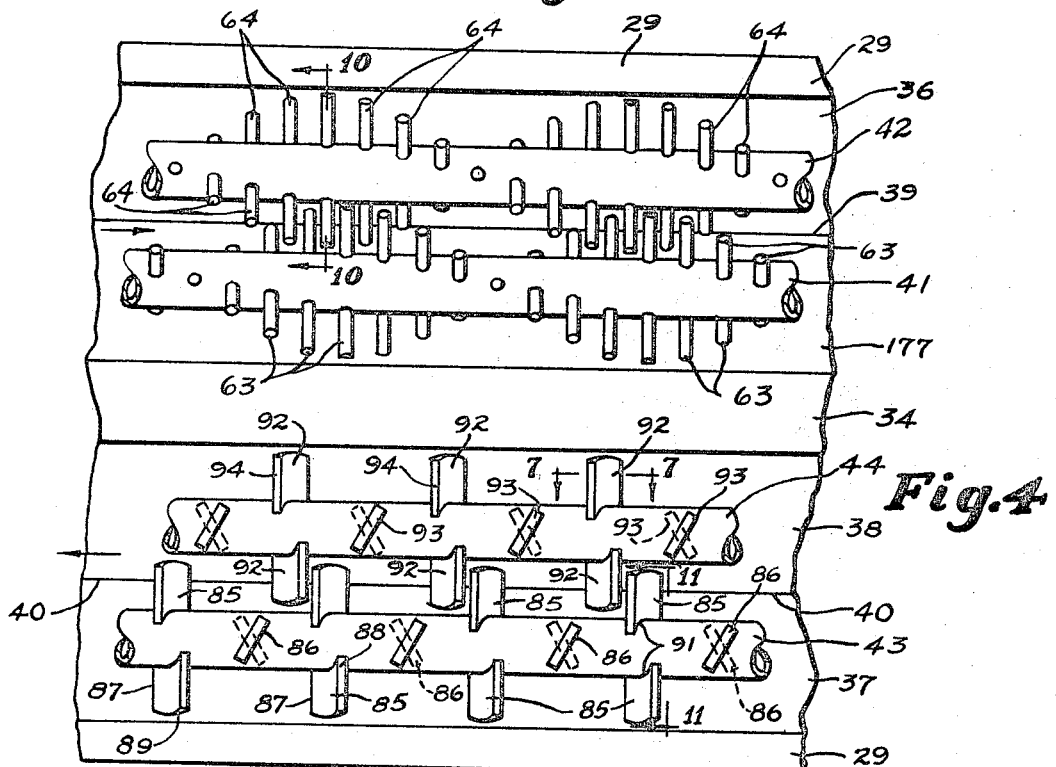

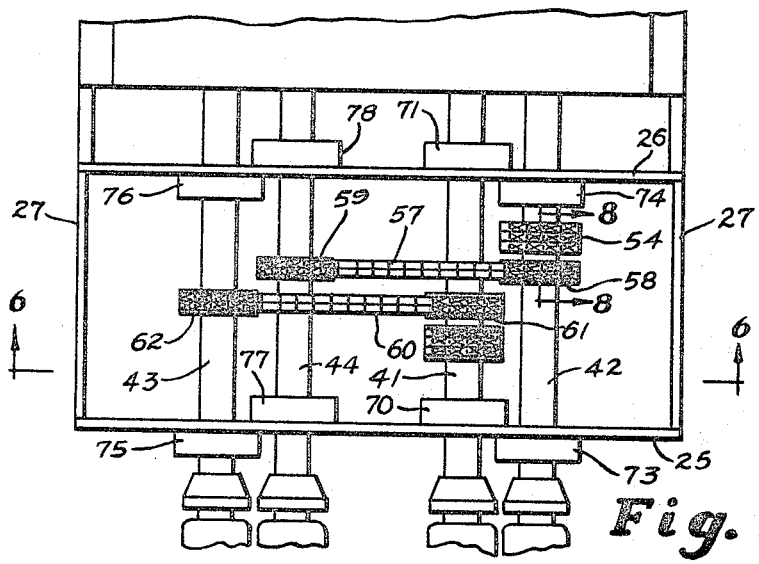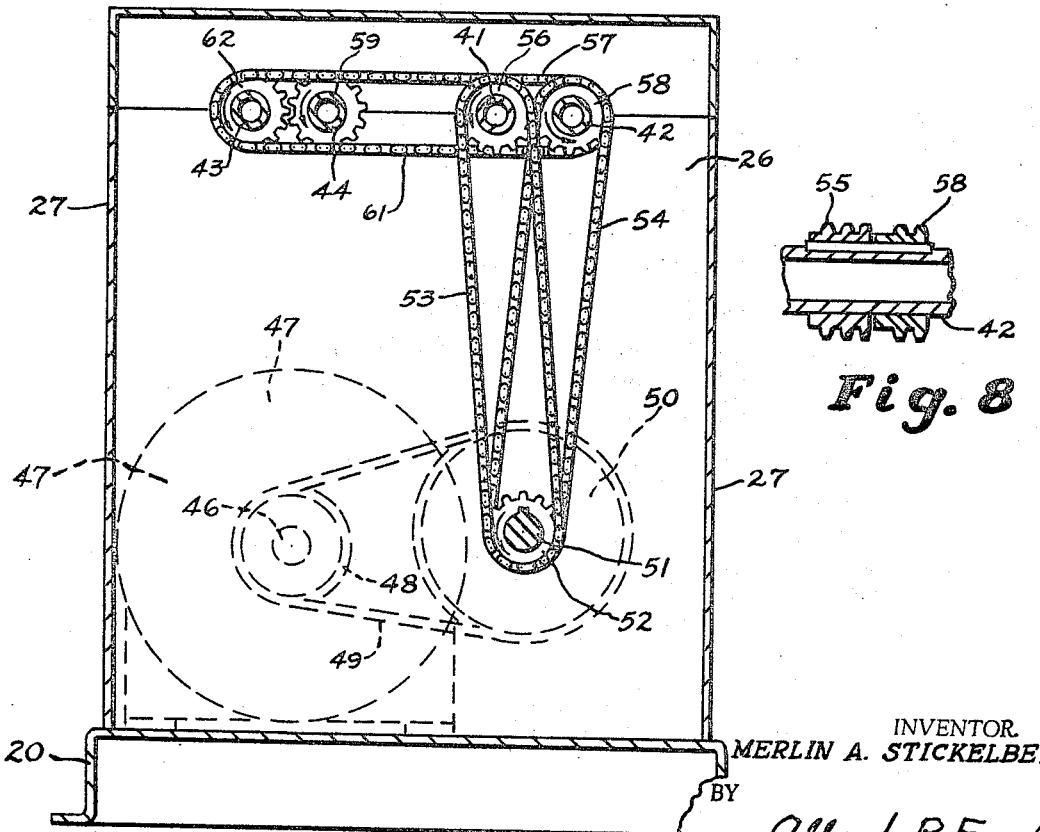

INVENTOR.
MERLIN A. STICKELBER
BY
Alfred R. Fuchs
ATTORNEY 3,332,368
CONTINUOUS DOUGH MIXER
Merlin A. Stickelber, Kansas City, Mo., assignor to Marion Corporation, a corporation of Nevada
Filed Dec. 21, 1965, Ser. No. 515,315
9 Claims. (Cl. 107—36)

My invention relates to continuous dough mixers and is an improvement over the mixer disclosed in my application Ser. No. 389,599, filed Aug. 14, 1965, on Continuous Mixer. My improved continuous mixer is particularly adapted for use in carrying out the method of making a yeast leavened dough, disclosed in my application Ser. No. 478,449, filed Aug. 9, 1965.

The method comprises the making of a yeast leavened dough by mixing all of the ingredients in a slow speed mixer only sufficiently to blend these ingredients, fermenting the resulting blend for from one and one-half to three hours, and rapidly mixing the fermented blend in a continuous mixer sufficiently to fully develop the dough. My present invention relates particularly to the the continuous mixer for fully developing the dough.

More specifically my continuous dough mixer includes dough confining means comprising a homogenizing chamber and a developing chamber. The homogenizing chamber is constructed in a similar manner to that described for the mixer in my application Ser. No. 389,599, comprising a tubular casing of considerable length relative to its diameter having a continuously open inlet leading into one end thereof and a continuously open outlet leading from the other end thereof, the casing being made up of a pair of partially cylindrical wall portions which meet along the center line of the casing, to form a ridge at the top and bottom of the inside of the casing. Each of the cylindrical wall portions is curved about the same radius and these have their axes of curvature located less than twice the radius from each other so that the above mentioned meeting of the two cylindrical wall portions in a ridge is obtained. Agitating means comprising a shaft extends lengthwise of the casing on the axis of each of the cylindrical wall portions, from which rods extend radially outwardly in spaced relation lengthwise and circumferentially of each of said shafts, the ends of the rods being in closely spaced relation to the cylindrical wall portions, the rods projecting from each shaft so as to be out of transverse alignment with the rods projecting from the other shaft and each rod of one shaft passing between the pair of rods of the other shaft closely adjacent to each other but out of contact.

The arrangement of the rod-like members is such that as one of the rod-like members leaves a position between a pair of adjacent rod-like members, it will move with its end into adjacency with one of the cylindrically curved wall portions, exerting a pulling action on the dough by the cooperative action of the rod-like members with each other and with the adjacent cylindrical wall portion. Also, as soon as any one of the rods leaves the adjacency of the cylindrical wall portion with which it is cooperating, it moves between a pair of rods on the other shaft to further cooperate therewith. Accordingly there is a continuous homogenizing action on all portions of the dough within the chamber completely hydrating the materials embodied in the dough, so that it is of a uniform composition throughout as it leaves the casing at its outlet end, with no excess water remaining in the dough. This makes it possible to use less dough for a baked loaf of a given size or weight.

Preferably the tubular casing is substantially horizontally disposed and the rods are circular in cross section and are arranged around each of the shafts so that the rod-like members on each of the shafts are in a spiral path around each of the shafts, which spiral path advances or turns in a direction to advance the material in the chamber from the inlet toward the outlet end by the turning of the shafts. It is highly important that the rod-like agitating members travel in opposite directions to each other when they are passing each other. In order to accomplish this movement of the agitating rods the two shafts upon which the same are mounted must rotate in the same direction.

Due to the action of the rod-like agitating means, and particularly due to the pulling action on the dough considerable heat is generated. As it is undesirable to have the temperature of the contents in the mixer exceed 90° F. suitable means is provided for cooling the contents of the mixer including the contents of the homogenizing chamber, by cooling the walls thereof by direct expansion cooling means and the rod-like members by cooling the shaft on which the same are mounted, by passing a direct expansion cooling medium through said shaft.

My improved continuous dough mixer further comprises a dough developing chamber, which is provided with a tubular casing substantially a duplicate of that provided for the homogenizing chamber and agitating means comprising shafts mounted on the axes of the cylindrical wall portions of the chamber, which are provided with vanes or paddles that cooperate with each other and with the walls of the developing chamber in a similar manner to that of the rod-like members in the first mentioned chamber, to exert a greater pulling action on the dough than the rod-like members so as to develop fully the gluten in the dough. The dough developing chamber is provided with an inlet that is at one end thereof and is connected directly with the outlet of the homogenizing chamber, and with an outlet that is at the opposite end thereof from said inlet.

The vanes or paddles are arranged so that they are provided with flat faces and have these flat faces extending at the same oblique angle to the axes of each of the shafts so that the angle of said faces of said paddles is so related to the direction of rotation of the shaft, that the paddles or vanes will cooperate with each other to advance the dough mixture from the inlet end of the developing chamber to the outlet end thereof, the shafts both rotating in the same direction as is the case of the shafts in the homogenizing chamber.

In order to maintain the dough at a temperature below a maximum of 90° F., cooling means is provided for the contents of the developing chamber that is of the same character as that provided for the homogenizing chamber, comprising direct expansion refrigerating means on the walls of the chamber and direct expansion refrigerating means for the paddles and shafts extending within the shafts, so that both interior and exterior cooling means is provided for the developing chamber, and means responsive to the temperature of the dough flowing from the outlet from said developing chamber controlling the flow of the refrigerant.

In order to obtain the desired homogenizing and gluten developing action of my improved continuous dough mixer, it is necessary to avoid the building up of undesirable pressures on the dough in the mixer. For this reason the inlet into the continuous mixer and the outlet from the continuous mixer are the same size. It is a purpose of my invention to provide dividing means for the dough leaving the mixer associated with the outlet connection therefrom, so that the dough can be divided directly into loaf sized pieces as it leaves the gluten developing kneading chamber. In order to prevent any possibility of a buildup of back pressure in the mixer, due to stoppage or improper operation of the dividing mechanism, it is a further purpose of my invention to provide means for relieving this pressure should such malfunction of the dividing mechanism occur, comprising a pressure relief valve mounted between the outlet to the mixer and the dividing mechanism.

Other objects and advantages of my invention will appear as a description of the drawings proceeds. However, I desire to have it understood that I do not intend to limit myself to the particular details shown or described, except as defined in the claims.

In the drawings:

FIG. 1 is a plan view partly broken away of my improved continuous dough mixing machine.

FIG. 2 is a side elevation thereof.

FIG. 3 is a transverse sectional view thereof taken on a line 3—3 of FIG. 2 on an enlarged scale.

FIG. 4 is a fragmentary view taken on a line 4—4 of FIG. 3 on a further enlarged scale.

FIG. 5 is a fragmentary plan view, showing the driving means for the shafts.

FIG. 6 is a view partly in elevation and partly in vertical section of the driving means for the shafts.

FIG. 8 is a fragmentary detail view partly in section taken on a line 8—8 of FIG. 5, the sprocket chains being omitted.

FIG. 9 is a fragmentary sectional view on an enlarged scale taken on the line 9—9 of FIG. 1.

FIG. 12 is a detail view partly in elevation and partly in section on the line 12—12, FIG. 1, on an enlarged scale.

Figure 13:
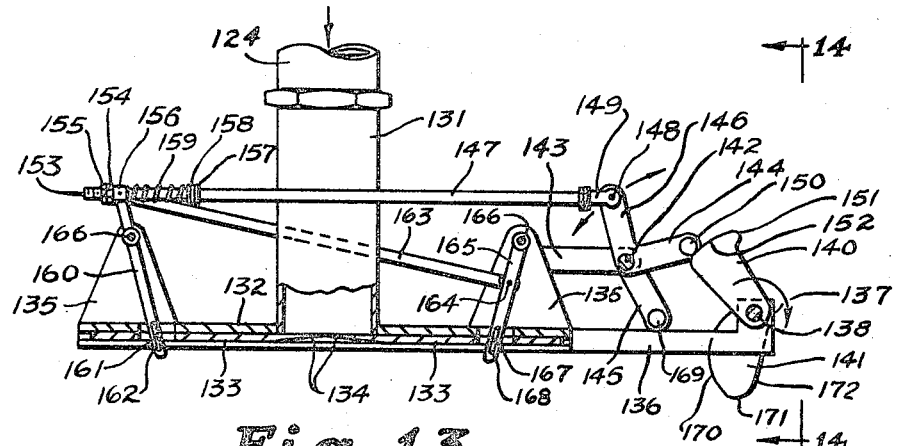
FIG. 13 is a view partly in elevation and partly in vertical section of the dough divider provided for my continuous mixer.
Figure 7:
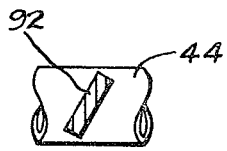
FIG. 7 is a fragmentary detail view taken on the line 7—7 of FIG. 4.
Figure 14:
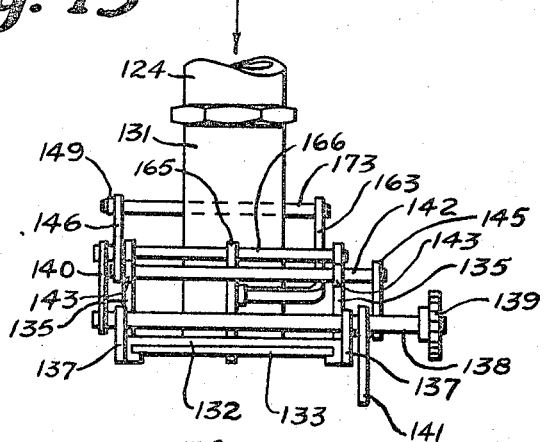
FIG. 14 is an end elevation thereof as viewed from the line 14—14 of FIG. 13.
Figure 10:
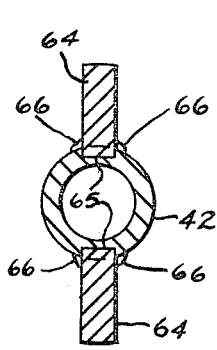
FIG. 10 is a section taken on the line 10—10 of FIG. 4 on an enlarged scale.
Figure 11:
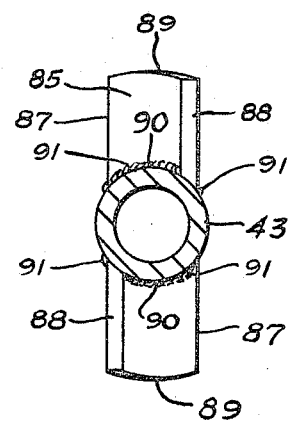
FIG. 11 is a section taken on the line 11—11 of FIG. 4 on an enlarged scale, partly broken away.

Referring in detail to the drawings, my improved dough mixing machine is provided with a base member 20 from which extend upwardly the housing 21 and 22. The housing 22 is provided with a pair of transversely extending vertical walls 25 and 26 and a pair of vertically extending end walls 27. The housing 21 is similarly constructed.

Mounted on the inner transverse walls of the housings, such as wall 26, is a lower casing member 28 which is provided with outwardly extending horizontal flanges 29 that are mounted on the brackets 30, which are welded to the wall 26 and to a similar wall of the housing 21. An upper casing portion 31 is mounted on the casing portion 28 having a pair of flanges 32 that are mounted on the flanges 29 and secured thereto detachably by means of suitable securing elements 33. The lower casing member 28 is provided with a horizontal wall portion 34 and the upper casing member 31 is provided with a horizontal wall portion 35. The wall portions 34 and 35 are in close face to face engagement as are also the flanges 29 and 32.

The casing portions 28 and 31 form a pair of tubular casings each of which is made up of a pair of partially cylindrical portions, one of said tubular casings having the partially cylindrical portions 177 and 36 and the other tubular casing having the partially cylindrical casing portions 37 and 38. Each of said partially cylindrical portions has about one-fourth of its circumference cut away, and when in the position shown in FIG. 3 and secured together in the manner above referred to, form a pair of continuous closed tubular casings, having the two partially cylindrical portions 177 and 36, and 37 and 38 running lengthwise thereof and meeting or joining in sharp ridges 39 at the top and bottom of one of said tubular casings and similar ridges 40 at the top and bottom of the other of said tubular casings.

Mounted on the axis of the cylindrical portion 177 is a tubular shaft 41 and mounted on the axis of the cylindrical portion 36 is a tubular shaft 42. Mounted on the axis of the cylindrical portion 37 is a tubular shaft 43 and mounted on the axis of the cylindrical portion 38 is a tubular shaft 44, all said shafts rotating about the axes of said cylindrical portions.

Suitable means is provided for driving the shafts 41, 42, 43 and 44 in the same direction of rotation, the direction of rotation being indicated by the arrows in FIG. 3. The driving means for the shafts is shown in FIGS. 2 and 6, as comprising a motor 45 which drives the shaft 46 through a reduction gearing 47, a pulley 48 being provided on the shaft 46 mounted thereon to rotate therewith over which a belt 49 operates, said belt also operating over a pulley 50 mounted on the shaft 51 to rotate therewith. The shaft 51 has a pair of sprockets mounted thereon, one of said sprockets being shown in FIG. 6 at 52, the sprocket chain 53 operating over said sprocket. A sprocket chain 54 operates over a similar sprocket also fixed on the shaft 51. The sprocket chain 54 operates over a sprocket 55 keyed on the tubular shaft 42. It will be noted upon refernce to FIG. 8 that the sprocket 55 is provided with a plurality of rows of sprocket teeth over which a plurality of chain portions comprising chain 54 operate. The sprocket chain 53 is of a similar character and operates over a sprocket 56 which is keyed to the tubular shaft 41. Thus both of the shafts 41 and 42 will rotate in the same direction, which is the direction of rotation of the shaft 51. A double sprocket chain 57 operates over a double sprocket 58 also keyed on the shaft 42 and over a double sprocket 59 keyed to the tubular shaft 44 and a similar sprocket chain 60 operates over a sprocket 61 keyed on the shaft 41 and a sprocket 62 keyed on the tubular shaft 43, the shaft 43 and 44 thus also rotate in the same direction as the shafts 41 and 42.

The shafts 41 and 42 have their axes spaced apart approximately one and one-half times the radius of curvature of the casing portions 177 and 36 and the shafts 43 and 44 are similarly spaced apart approximately one and one-half times the radius of curvature of the casing portions 37 and 38. Mounted on the shaft 41 are radially extending rods 63 and mounted on the shaft 42 are radially extending rods 64. Each of the rods 64 is mounted in a socket 65 in the hollow shaft 42 and each of the rods 63 is mounted in a similar manner in the hollow shaft 41. Each of said rods 63 and 64 extends with the outer end thereof located closely adjacent the cylindrical surfaces of the casing portions 177 and 36. The spacing of the shafts 41 and 42 and the length of the rods 63 and 64 is such that the rods 63, in passing near the shaft 42, approach the shaft 42 approximately as closely as they approach the inner curved wall portion of the casing portion 177, and similarly, the rods 64 approach as closely to the shaft 41 as to the inner curved wall portion of the casing portion 36. Each of the rods 63 and 64 fits closely in the socket 65 and is secured in position by means of welds 66.

Preferably the spacing of the ends of the rods from the curved wall portions 177 and 36 is about one-sixteenth of an inch. The rods 63 are spaced from each other longitudinally of the shaft 41 and are arranged so that they lie in a spiral path around the shaft 41, the spiral advancing in such a direction that the rotation of the shaft 41 will advance any material that may be engaged by the rods 63 in a direction lengthwise of the tubular casing, away from the inlet 67 toward the outlet 68 thereof. The outlet 68 is a transverse passage that connects with the tubular casing having the casing portions 37 and 38 and thus also serves as the inlet to this tubular casing through which the shafts 43 and 44 pass. The outlet to this last mentioned tubular casing, having the partially cylindrical wall portions 37 and 38, is located at the opposite end thereof being indicated by the numeral 69.

The shaft 41 is provided with bearings 70 and 71 which are mounted on the vertical walls 25 and 26, at the end thereof that extends through the casing 22 and is provided with similar bearings mounted in a similar manner on the vertical walls of the housing 21. The shaft 42 is provided with similar bearings 73 and 74, mounted in staggered relation to the bearings 70 and 71 so that the shafts 41 and 42 can be brought into proper spaced relationship to each other. The shafts 43 and 44 are similarly provided with bearings 75 and 76 and 77 and 78, it being understood that there are a pair of bearings on the vertical walls of the housings at each end of the machine similar to what is shown for the one of the machine in FIG. 5. The shafts thus all extend through the end walls 79 and 80 of the tubular casings.

The end walls are constructed as shown in FIG. 9 having the wall portions 81 and 82 which fit closely together to make a fluid tight joint, being in the form of vertical flanges on the respective casing portions 28 and 31. The meeting edges of the portions 81 and 82 are ground down so as to fit closely to prevent any escape of dough through the joint. The construction of the end wall 79 is shown in FIG. 9 and the end wall 80 is similarly constructed. The passage 68 connecting the two tubular chambers is made up of the end wall portions 81 and 82 and curved wall portions 83 and 84 that are similarly ground to make a close joint between the abutting edges thereof.

Mounted on the shaft 43 are pairs of diametrically oppositely arranged paddles 85, said paddles being uniformly spaced lengthwise of the shaft from each other and mounted between each of the adjacent pairs of paddles 85 are similar paddles 86 which are similarly arranged diametrically opposite each other and are located midway between the paddle 85, and around the shaft, 90° from the paddles 85. The paddles 85 and 86 all extend at the same oblique angle to the axis of the shaft 43. The edges of the paddles nearest the outlet 69 are referred to as the forward edges thereof. The forward edge 87 of each of the paddles 85 and 86 is so located with respect to the direction of rotation of the shaft 43 that these edges will last engage the dough as the shaft rotates, about its axis. Thus all the paddles 85 and 86 will serve to move the dough in the chamber, having the partially cylindrical wall portions 37 and 38, toward the outlet 69. Each of said paddles has the straight side edge 87, and a parallel straight side edge 88 which may be referred to as the rear edge thereof, a convexly curved outer edge 89 which is curved substantially to the curvature of the tubular casing portion 37, and a concave inner edge 90 which is curved to the contour of the outer convex surface of the tubular shaft 43. Each of the paddles 85 and 86 is welded to the outer surface of the shaft 43 as indicated at 91.

Mounted on the shaft 44 are the paddles 92 and 93. The paddles 92 and 93 are arranged in a similar manner on the shaft 44 to the arrangement of the paddles 85 and 86 on the shaft 43, the paddles 93 being of the same shape as the paddles 85 and being arranged at the same angle to the axis of the shaft as the paddles 85. The paddles 93 are arranged in a similar manner to the paddles 86 and inclined at an oblique angle to the axis of the shaft 44 in a similar manner to the paddles 86. Also the paddles 92 are arranged diametrically opposite each other and the paddles 93 are arranged diametrically opposite each other and are around the shaft 90° from the paddles 92. The forward edges 94 of all said paddles 92 and 93 are so related to the direction of rotation of the shaft 44 that the paddles 92 and 93 in their rotation will move the dough forwardly toward the outlet connection 69.

The paddles on the shaft 44 are related to the paddles on the shaft 43 so that the forward edges of the paddles 85 will pass closely adjacent the rear edges of the paddles 92 and the rear edges of the paddles 85 will pass closely adjacent the forward edges of the paddles 93 as these paddles pass each other during the rotation of the shafts 43 and 44 in the same direction of rotation. Similarly the paddles 86 on the shaft 43 will pass with their forward edges closely adjacent the rear edges of the paddles 93 and with their rear edges closely adjacent the forward edges of the paddles 92. Also the outer curved end portions 89 of the paddles 85, 86, 92 and 93 pass closely adjacent the curved wall portions of the cylindrical casing portions 37 and 38 of the tubular casing. This will result in a pulling action on the dough by the paddles as the paddles on the one shaft recede from the paddles on the other shaft and as the ends of the paddles move away from the curved wall portions 37 and 38. This pulling action of the paddles fully develops the gluten in the dough.

The means for cooling the walls of the chambers of my continuous mixer, comprise the cooling coil 95 for the walls of the lower casing member 28 and the cooling coil 96 for the walls of the upper casing member 31. Each of the coils comprises a plurality of serially connected refrigerant passages 97, so that the flow of the refrigerant, in the case of the coil 96 for example, will be from the inlet connection 98 of said coil, through the various passages 97 in succession to the outlet connection 99 thereof. The flow in the coil 95 will be in a similar manner through the succeeding passages 97 of said coil from the inlet connection 100 thereof to the outlet connection 101 thereof. The coils 95 and 96 are portions of a direct expansion refrigerating system of the usual character, the refrigerant flowing through the coils 95 and 96, during expansion to cool the walls of the mixing chambers of the mixer. A suitable heat insulating material 102 is provided surrounding the cooling coils and the mixer casing member. The inlet connections 98 and 100 and the outlet connections 99 and 101 are provided with flexible conduit portions 126.

Means is also provided for conducting a cooling medium into the tubular shafts 41, 42, 43 and 44 and circulating said cooling medium through the same. For this purpose the tubular shaft 41 has a refrigerant inlet connection 103 leading into the same and a refrigerant outlet connection 104 leading from the same. Similarly the shaft 42 has a refrigerant inlet connection 105 and a refrigerant outlet connection 106. The shaft 43 has a refrigerant inlet connection 107 and a refrigerant outlet connection 108 and the shaft 44 has a refrigerant inlet connection 109 and a refrigerant outlet connection 110.

In order to obtain a fluid tight connection between the refrigerant conduits and the hollow shafts each of the refrigerant inlet and outlet conduits is connected with the shaft in the manner shown in FIG. 12 which illustrates the connection between the inlet conduit 103, for feeding the refrigerant into the shaft 41, and said shaft. The inlet connection 103 is provided with a tubular member 111 which carries the inner ring of a pair of ball bearings 112 the outer ring of which is mounted in a sleeve 113, which is provided with a spacing member 114 for said bearing rings and which has an end wall closure 115. The sleeve 113 is mounted on the shaft 41 to rotate therewith, a reduced extension 116 being provided on the sleeve 113, which is provided with an inwardly directed annular shoulder 117 and which is connected with the shaft 41 by suitable coupling means 118 having gasket means 119 therein to make the joint fluid tight. A fluid tight joint is maintained between the end of the tubular member 111 and the shaft by means of gasket means 120 mounted between a ring 121, that is mounted between the end of the tubular sleeve 111 and said gasket means, and a compression spring 122, which is mounted between the gasket 120 and the annular shoulder 117 to press said gasket against the ring 121.

In order to control the flow of refrigerant to the cooling coils 95 and 96 and the hollow shafts 41, 42, 43 and 44, suitable temperature responsive means is provided. In order that the temperature of the dough leaving the mixer will not exceed 90° F., it is preferred that the controlling means be adjusted to start the operation of the refrigerating means whenever the temperature of the dough exceeds 86° F. The means for controlling the refrigerating means comprises a thermostatically controlled switch 123, which is mounted in the outlet conduit 124, as close to the outlet connection 69 as is possible, and which is provided with electrical connections 125 extending therefrom to the refrigerating system to control the operation thereof in accordance with the position of the contacts of the thermostatically controlled switch 123.

The dough mixture to be acted on by my improved mixer is fed to the inlet connection 67 by a dough pump 127 which is connected with the inlet connection 67 by a conduit 128, the dough mixture being supplied to the dough pump from a hopper 129. The outlet conduit 124 preferably has a divider 130 connected therewith, said divider being provided with a vertical dough conduit 131, which is connected with the outlet connection 124, at its upper end.

The divider has a guideway 132 for a pair of slide members 133, which are provided with knife edged end portions 134, which, in the position of the parts shown in FIG. 13, cut off the discharge of dough from the conduit 131. Means is provided for reciprocating the slides 133 in timed relation to the operation of the dough pump 127 so as to discharge the desired size pieces of dough from the divider, either into a pan directly or to be conveyed to other apparatus such as a rounder. The means for reciprocating the slides 133 is mounted on the divider by means of a pair of upstanding bracket members 135 on each side of the body portion and brackets 136 extending endwise from said body portion of the rounder. The brackets 136 are provided with upstanding ears 137 provided with suitable bearings for a shaft 138 which is provided with a drive sprocket 139 which is driven by the drive means for the dough pump 127 by any suitable driving connection to rotate the shaft in the direction indicated by the arrow in FIG. 13.

Mounted on the shaft 138 so as to rotate therewith are the cams 140 and 141. The shaft 142 is mounted on a pair of arms 143 extending from the upwardly extending bracket 135. Levers 144 and 145 are mounted on the shaft 142 to turn therewith. The lever 144 has an arm 146 that is connected with a rod 147 by means of a pivot 148 there being preferably an adjustable connection provided between the rod 147 and the fitting 149 providing the bearings for the pivot pin 148. The lever 144 is provided with a roller 150 that engages the cam 140, said cam having a nose portion 151 and a curved face 152, which is engaged by the roller 150.

The end of the rod 147 opposite that having the fitting 149 thereon is provided with a screw threaded portion 153 with which the nuts 154 and 155 are engaged. A block 156 is slidably mounted on the rod 147 and is limited in its movement to the left as viewed in FIG. 3 by the nut 154. A pair of nuts 157 and 158 is also provided on said threaded portion of said rod and a compression coil spring 159 is mounted between the block 156 and the nut 158, the spring 159 yieldingly holding the block 156 in engagement with the stop nut 154. A shaft 173 is mounted in the block 156 and the lever 160 is pivotally mounted at its upper end on said shaft 173. A pivot pin 161 operating in the slot 162 of said lever 160 is mounted on one of the slides 133, to connect said slide with the lower end of the lever 160. A rod 163 is also pivotally mounted on the shaft 173 and is pivotally connected at 164 with a lever 165 which is mounted on a pivot 166 extending between a pair of the ears 135. Said lever 165 is pivotally connected with the other slide 133 by means of the pivot pin 167 operating in the slot 168.

It will accordingly be seen that as the block 156 moves to the right as viewed in FIG. 13 the lever 160 will be turned clockwise and the slide 133 connected therewith will be moved to the left while the lever 165 will be moved counter-clockwise and the slide 133 connected therewith will be moved to the right, thus moving the slides to dough discharging position.

When the roller 150 engages the cam surface 152 the parts will have moved to the position shown in FIG. 3. The lever 145 is provided with a roller 169 which is adapted to be engaged by the cam 141. The cam 141 has a curved surface 170 which extends to the high point 171 of the cam and then recedes as shown at 172. It will accordingly be seen that as the portion 171 of the cam is approached the roller 169 will be engaged thereby and the lever 145 will be moved to the left as viewed in FIG. 13 moving the arm 146 of the lever 144 to the right and moving the rod 147 endwise of itself to the right and the block 156 to the right to swing the lever 160 clockwise and the lever 165 counterclockwise to open the bottom end of conduit which had been blocked by the slides 133. Upon engagement of the cam 140 with the roller 150 the slides 133 will be moved quickly, as the nose portion 151 of the cam 140 is engaged, back to the position shown in FIG. 13.

While the driver of the shaft 138 will be in proportion to the speed at which the dough pump 127 feeds the dough mixture, it is necessary to provide means for preventing an undue buildup of pressure in the mixture either due to malfunction of the dividing mechanism 130 or from any other cause. Means is accordingly provided that is responsive to the pressure in the outlet connection 124 for relieving this pressure, should it reach above a predetermined maximum. As the pressure in the outlet connection 124 would be the same as that in the mixing chambers of the mixer, relief thereof will prevent undue buildup of pressure in the mixing chambers. Accordingly a pressure relief valve 174 is provided that has an outlet connection 175 for discharge of the dough from the outlet connection 124 in case the pressure builds up above that desired.

The shafts 41, 42, 43 and 44 pass through openings in the end walls of the tubular casings that are slightly larger than said shafts, each of said shafts being provided with fluid seals mounted on said end walls, one of said sealing members 176 for the shaft 42 being shown in FIG. 9.

What I claim is:

1. A continuous mixer comprising a first elongated chamber and a second elongated chamber, an inlet leading into said first chamber adjacent one end thereof, an outlet leading from said first chamber adjacent the other end thereof, an inlet leading into said second chamber at one end thereof, means connecting the outlet of said first chamber with the inlet of said second chamber, an outlet from said second chamber adjacent the opposite end thereof from said inlet thereof, each of said chambers having a casing having a pair of partially cylindrical wall portions, each of said cylindrical wall portions having the same radius of curvature, said cylindrical wall portions being curved about parallel axes spaced transversely of said casing a distance greater than said radius but less than twice said radius and meeting midway of the width of said casing to form inwardly directed opposed longitudinal central ridges on the interior of said casing, shafts extending lengthwise of said casings on each of said axes, means for rotating the shafts in each casing in the same direction, rods extending outwardly from each of said shafts in said first chamber with their ends in closely spaced relation to said cylindrical wall portions, the rods projecting from each of said shafts in said first chamber being out of transverse alignment with the rods on the other shaft in said first chamber and each passing between and in closely adjacency to a pair of rods on the other shaft in said first chamber, paddles extending outwardly from each of said shafts in said second chamber to closely adjacent said cylindrical wall portions, the paddles projecting from each of the shafts in said second chamber being out of transverse alignment with the paddles on the other shaft in said second chamber, the paddles on one of said shafts in said second chamber passing between and in close adjacency to the paddles on the other shaft in said second chamber.

2. A continuous mixer as claimed in claim 1 in which the rods are circular in cross section.

3. A continuous mixer as claimed in claim 1 in which the rods on each of said shafts in said first chamber are located in a spiral path around said shaft turning in a direction to advance the material in said first chamber from said inlet of said first chamber toward the outlet of said first chamber upon turning of said shafts in said first chamber.

4. A continuous mixer as claimed in claim 1 in which said shafts are tubular and are provided with means for passing a refrigerant therethrough and the walls of said casings are provided with means for flowing a refrigerant over the same.

5. A continuous mixer as claimed in claim 1 in which the paddles on each of said shafts in said second chamber are positioned on said shafts to advance the material in said second chamber from said inlet of said second chamber toward the outlet of said second chamber upon turning of said shafts in said second chamber.

6. A continuous mixer as claimed in claim 1 in which the rods on each of said shafts in said first chamber are located in a spiral path around said shaft turning in a direction to advance the material in said first chamber from said inlet of said first chamber toward the outlet of said first chamber upon turning of said shafts, and in which the paddles on each of said shafts in said second chamber are positioned on said shafts to advance the material in said second chamber from said inlet of said second chamber toward the outlet of said second chamber upon turning of said shafts.

7. A continuous mixer as claimed in claim 1 in which said paddles are flat and extend at the same oblique angle to the axis of the shafts on which said paddles are mounted.

8. A continuous mixer as claimed in claim 1 in which said shafts are tubular and are provided with means for passing a refrigerant therethrough and the walls of said casings are provided with means for flowing a refrigerant over the same and means responsive to the temperature of the dough passing from the outlet of said second chamber for controlling the flow of refrigerant through said shafts and the means for flowing refrigerant over the walls of said casings.

9. A continuous dough mixer comprising dough confining means and agitating means in said confining means said confining means having partially cylindrical wall portions having the same radius of curvature and being curved about parallel axes spaced transversely of said confining means a distance greater than said radius but less than twice said radius, said partially cylindrical wall portions meeting to form longitudinal central ridges on the interior of said confining means, said agitating means comprising tubular shafts on said axes, means for rotating said shafts in the same direction, rods circular in cross section and paddles having flat faces mounted on said shafts, said rods extending perpendicularly to the axis about which the same travel and the paddles having their flat faces extending obliquely to the axes about which the same travel, the outer ends of said rods and paddles being in closely spaced relation to said cylindrical wall portions, the rods and paddles on the shafts being out of transverse alignment with each other and being mounted on said shafts so that the rods on one shaft pass between the rods on the other shaft in close adjacency and the paddles on one shaft pass between the paddles on the other shaft in close adjacency, dough inlet means leading to said confining means to engage said dough with said rods, said rods being located in spiral paths around said shafts in a direction to advance said dough from said inlet means lengthwise of said shafts toward said paddles, an outlet connection from said confining means, said paddles extending in a direction to advance said dough toward said outlet connection, means for passing refrigerant through said shafts, means for flowing a refrigerant over said wall portions, and means responsive to the temperature of the dough passing through said outlet connection for controlling flow of refrigerant through said shafts and over said wall portions.

References Cited

UNITED STATES PATENTS

| | | | |
|---|---|---|---|
| 710,619 | 10/1902 | Sharpless | 259—64 X |
| 2,731,241 | 1/1956 | Christian | 259—104 X |
| 3,155,056 | 11/1964 | Smith et al. | 259—6 X |
| 3,198,491 | 8/1965 | Loomans et al. | 259—6 |

FOREIGN PATENTS 405,158   7/1943   Italy.

WILLIAM I. PRICE, *Primary Examiner.*